United States Patent

[11] 3,536,213

| [72] | Inventor | Neubar Kamalian<br>2030 F St., Apt. 606 NW, Washington,<br>District of Columbia 20006 |
|---|---|---|
| [21] | Appl. No. | 754,419 |
| [22] | Filed | Aug. 21, 1968 |
| [45] | Patented | Oct. 27, 1970 |

[54] MISSILE TRANSPORTING AND HOISTING APPARATUS
7 Claims, 9 Drawing Figs.

[52] U.S. Cl. .................................................... 214/38,
244/137
[51] Int. Cl. ................................................... B65g 67/02
[50] Field of Search ........................................... 214/38.42,
38.46, 38.8, 44; 254/48; 244/137

[56] References Cited
UNITED STATES PATENTS

| 2,411,647 | 11/1946 | Bonnell et al. ................. | 244/137 |
| 2,539,201 | 1/1951 | Pasko ........................... | 296/35.1 |
| 2,634,000 | 4/1953 | Ulrich .......................... | 244/137 |
| 2,685,423 | 8/1954 | Meadowcroft et al. ........ | 244/137 |

*Primary Examiner*— Robert G. Sheridan
*Attorneys*— Q. Baxter Warner and Edward J. Brower ABSTRACT: A transporter and hoist for heavy elongate loads such as missiles which includes a vehicle supporting a pair of individual missile receiving cradles, each cradle having straps extendible from the four corners, the ends of which straps are to be secured near an overhead missile launch station. A self-contained mechanical advantage hoist means on each cradle is hand operable to shorten all straps in unison to thereby raise the cradle and missile to the overhead station.

Patented Oct. 27, 1970

INVENTOR.
NEUBAR KAMALIAN

BY Q. Baxter Werner
ATTORNEY

Patented Oct. 27, 1970 3,536,213

MISSILE TRANSPORTING AND HOISTING APPARATUS

The invention described herein may be manufactured and used by or for the Government of the United States of America for governmental purposes without the payment of any royalties thereon or therefor.

BACKGROUND OF THE INVENTION

1. Field of the Invention

The invention is directed to devices for transporting and elevating elongate objects such as missiles, bombs and rockets. Such loads are usually heavy and awkward to handle, also they are explosive in nature and must be handled with care. Since loading operations frequently have to be performed under adverse weather conditions, at night or on the pitching deck of a carrier at sea, it is important that the load be completely under the operator's control at all times. Furthermore it should be preferably be capable of one man operation in a crowded or confined area under the aforementioned difficult conditions.

2. Description of the Prior Art

Prior devices of this character require heavy parts, are open in construction, are usually complex in nature and do not provide a unitary assembly with working parts substantially enclosed from the weather. Furthermore, such devices are not readily adjustable for use with objects of varying diameter and are frequently inherently unsafe and not capable of one-man operation.

SUMMARY OF THE INVENTION

The present invention includes a steerable wheeled vehicle, the length of which is adjustable. This vehicle supports a pair of missile supporting cradles each of which has adjustable load engaging rollers upon which the missile rests. Each cradle has extendible straps or cables at each corner stored on reels within the cradle which straps may be extended to and secured at an overhead missile station.

A separate torque-augmenting actuating means is mounted on each cradle and is accessible for one-man operation to retract or extend the cables to thereby bodily raise or lower the cradle and its load to or from an overhead missile station. Suitable means is provided for varying the roller position to accommodate varying load sizes and for retracting all extensible cables equally to assure level and uniform missile lift. Means are provided to allow one end of the cradle to continue to rise after the other end abuts the launcher station stop. A spring controlled reel arrangement permits the cables to be extended and secured in an overhead position before lift, and a brake is provided to prevent loss of control as a load is being hoisted or lowered.

Other objects, advantages, and novel features of the invention will become apparent from the following detailed description of the invention when considered in conjunction with the accompany drawings.

DESCRIPTION OF THE PREFERRED EMBODIMENT

Figure 2:
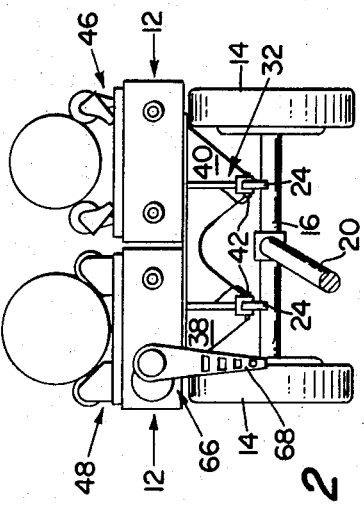
FIG. 2 is a reduced front elevational view of the embodiment illustrated in FIG. 1.

Referring now to the drawings in detail, the preferred embodiment includes a vehicle designated generally as 10 which has thereon a pair of cradles or missile trays 12, (FIG. 2). The vehicle may be of any conventional design having pairs of forward and aft wheels 14—15 mounted on transverse axles 16—18 one set of wheels being steerable in order to control vehicle direction. A towbar 20 may be provided at one end of the vehicle for towing and direction controlling operation in the conventional fashion.

In the embodiment illustrated a pair or longitudinal beams 22 interconnect front axle 16 and rear axle 18. Such beams may be circular in shape and from the upper surface of each extends a short forward mounted flange 24 and a longer rear mounted flange 26. Each flange has a considerable number of spaced openings 28 and 30, respectively, along its length which represent adjustment positions and through which a coupling pin may be inserted.

Figure 1:
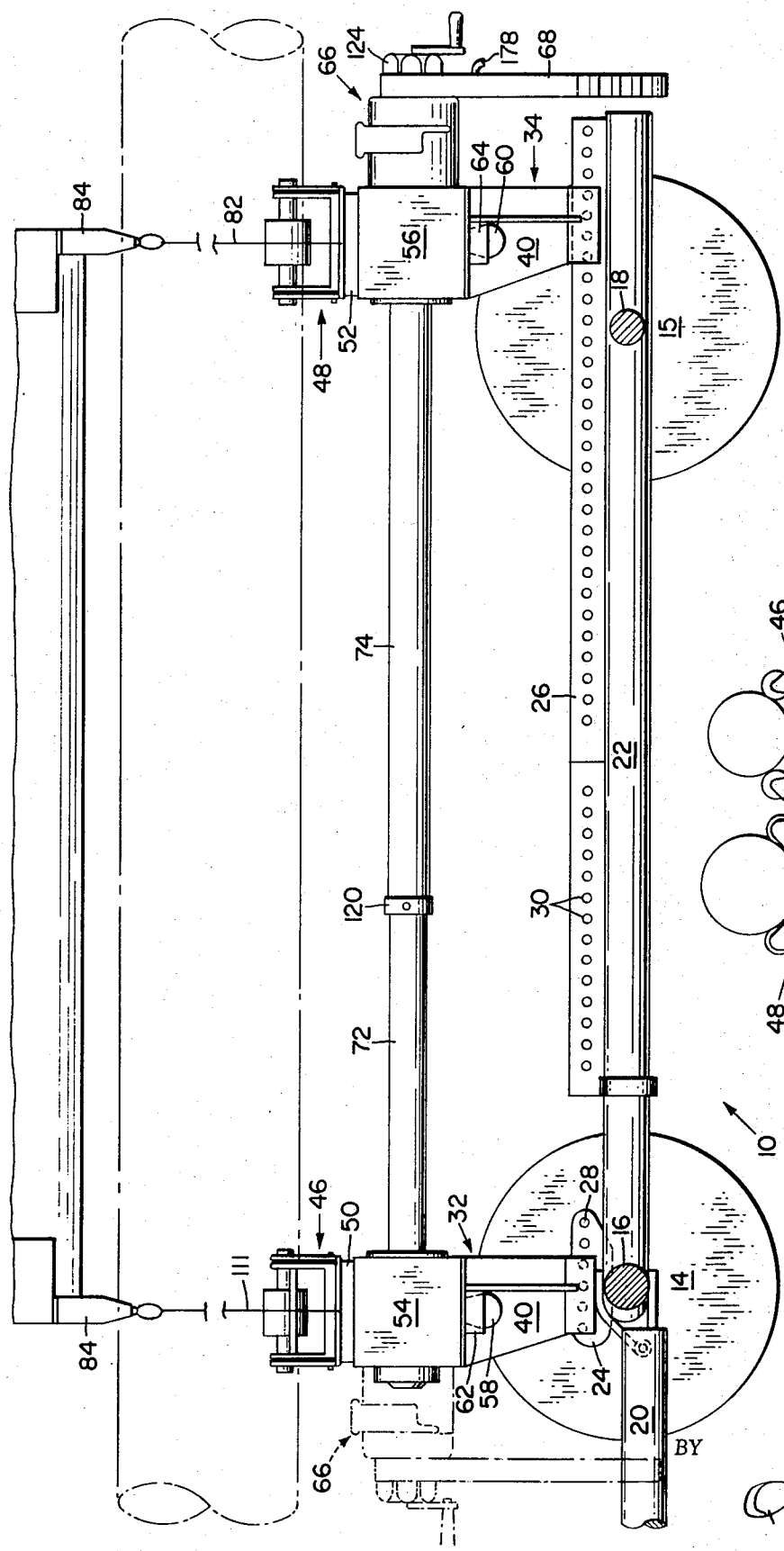
FIG. 1 is a side elevation, partially in section of a transporter vehicle with installed cradle assembly illustrating one embodiment of the present invention.

As shown in FIG. 1 forward and aft saddle assemblies 32 and 34 may be mounted upon these upright flanges 24 and 26. Each saddle includes a pair of legs 38 and 40 (FIG. 2) which are grooved along their under surfaces to receive upright flange 24 or 26. As illustrated, coupling pins 42 with attached lanyards serve to retain the saddle assemblies 32 and 34 in their selected spaced apart condition. These forward and aft saddles extend substantially the width of the vehicle as illustrated in FIG. 2 and hence are large enough to accommodate two missile supporting cradles 12 in side-by-side relationship.

Each cradle comprises adjustable missile supporting roller assemblies 46, 48 which rest on top plates 50, 52 of enclosed cable housings 54, 56 from which cables may vertically extend in a manner hereinafter to be described. At the bottom of each cable housing is a rounded aligning peg 58, 60 which is receivable in a socket 62, 64 provided in the top surface of the saddles 32 and 34 respectively. The pegs 58 and 60 are rounded as shown to facilitate their ready withdrawal from their respective sockets. This is important since the overhead station may be vertically displaced to one side and hence the elevating movement can be at an angle with consequent tendency of a straight peg to bind in its socket.

Figure 3:
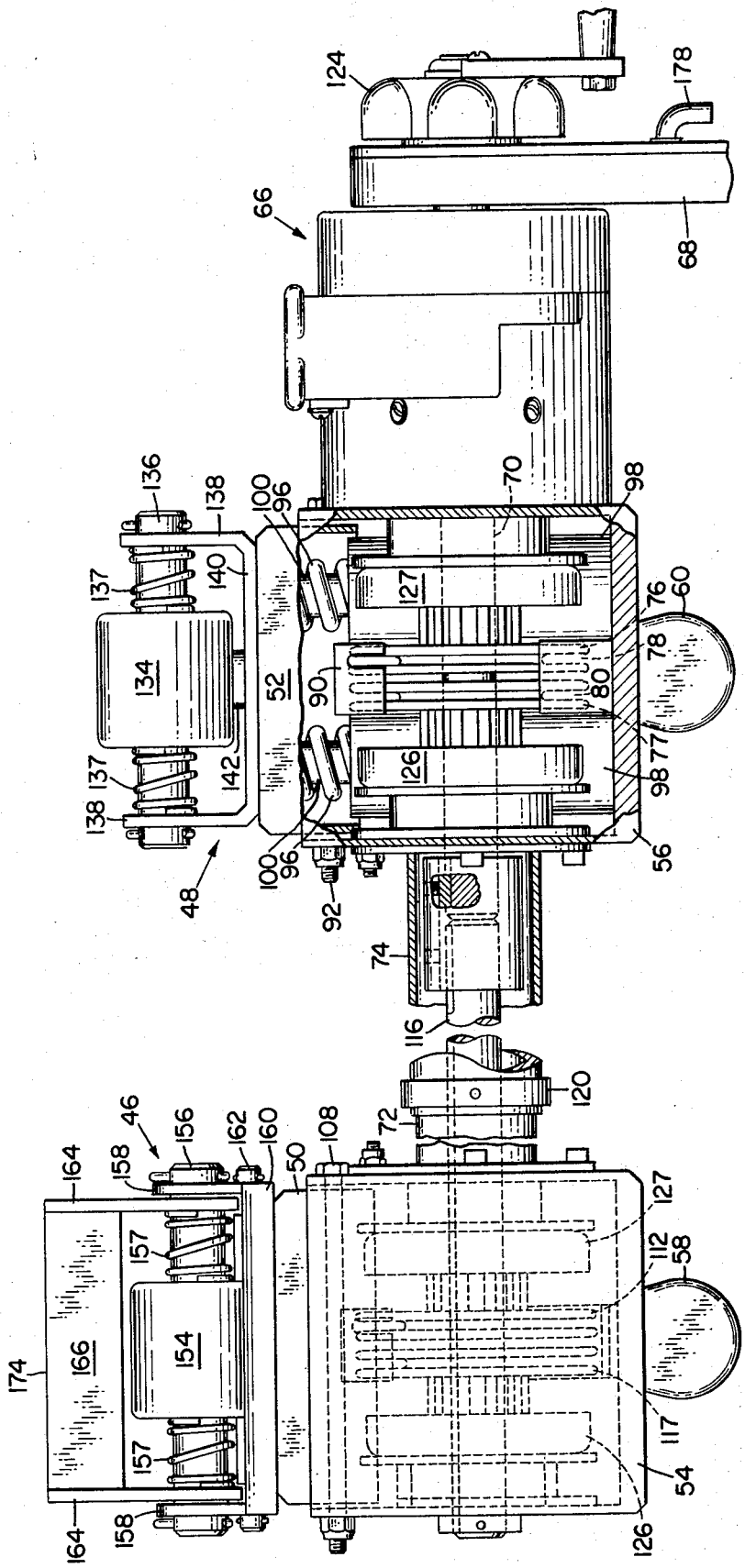
FIG. 3 is a greatly enlarged side elevational view of a load supporting cradle or tray with the intermediate portion broken away.

Each individual cradle has mounted on one end a manually operable torque-converting or mechanical advantage gear train drive assembly 66 which incorporates a selective clutch and brake control and is fully described in in U.S. Pat. No. 2,453,581 and hence will not be described in detail herein. The input to such assembly is from a hand lever 68 which, through internal gearing, imparts rotation to an output shaft 70 (FIG. 3). The disconnect and brake modes of operation are controlled through operation of crank wheel 124 and the direction of drive is controlled through manipulation of thumb lever 178.

Figure 4:
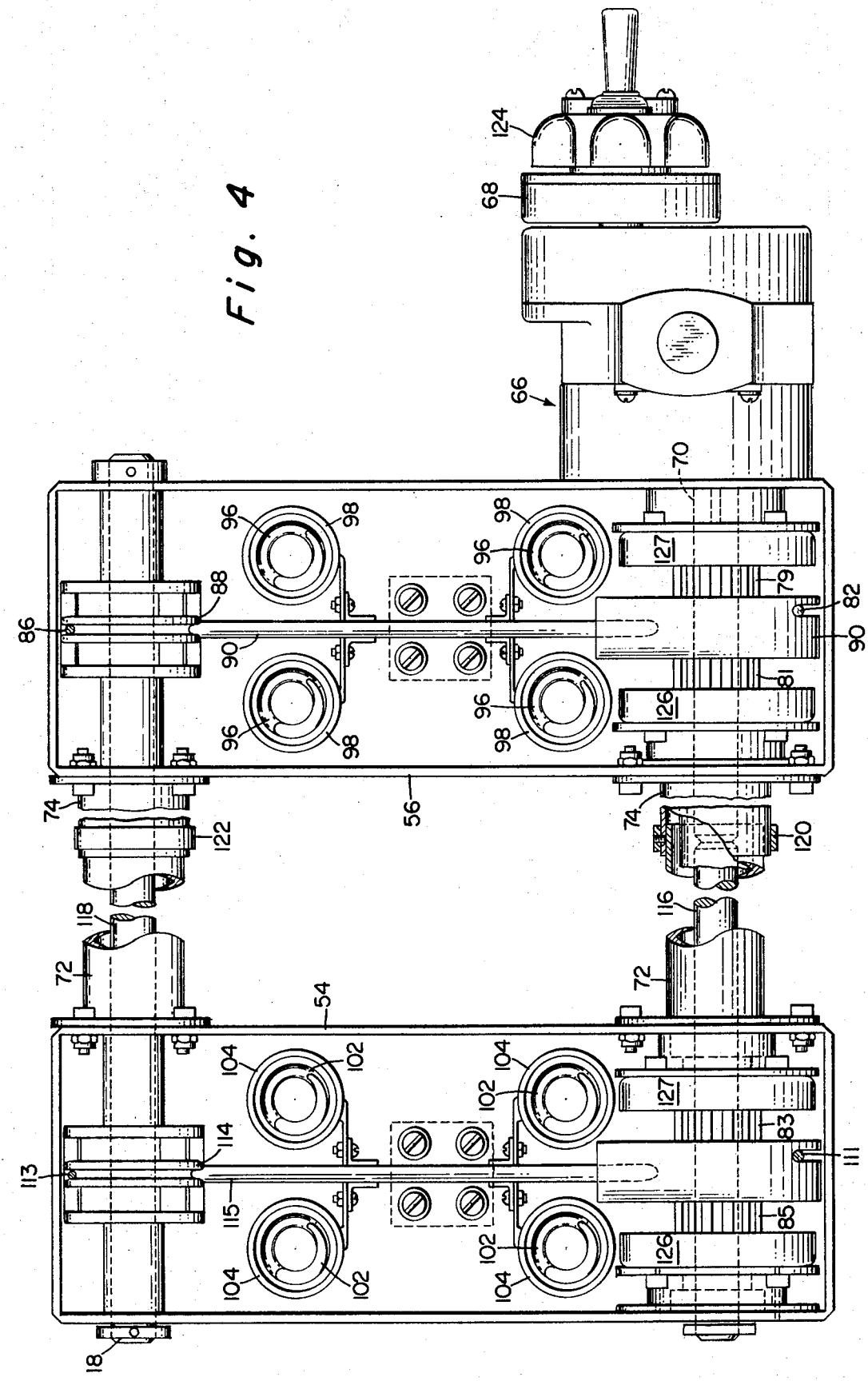
FIG. 4 is a top plan view of the cradle of FIG. 3 with the load supporting roller mounting cover plates removed.

Referring now to FIGS. 3 and 4 there are shown enlarged side elevation and top views, respectively, of the cable housings 54 and 56 comprising opposite ends of each cradle, these are interconnected by telescoping tubes 72 and 74 which arrangement permits the cable housings 54, 56 to be selectively spaced from each other to vary cradle length to fit the selected position of the vehicle saddles.

As stated the torque-converting gear train assembly 66 translates oscillatory movement of hand lever 68 to rotary movement of drive shaft 70 which latter extends into one side of the cable housing 56. Upon that drive shaft are secured cable reels 76—77 each having a cable receiving slot 78—80 extending deeply therein as shown. From slot 78 cable 82 extends upwardly through a suitably grommeted opening in the cable housing top plate 52 and this cable has a terminal end fitting 84 for securing at the missile loading station.

A second cable 86 is wound in slot 80 and extends transversely across the cradle to a single grooved pulley 88 from which it extends vertically to a second missile loading station. As shown this cable 86 may be guided along its course by a shield 90 to keep it from jumping the slot of the reel or the groove of pulley 88.

Cable housing top plate 52 which mounts load supporting roller assembly 48, is preferably spring-supported and telescopes slightly within cable housing 56. Such movement being limited by the action of bolt 92 and slots 94. Within the cable housing four compression springs 96 surrounded by guide tubes 98 receive four aligning pins 100 which depend from the undersurface of top plate 52 and extend axially into the hollow bores of springs 96.

At the other end of the cradle the cable housing top plate 50 which supports the load-supporting roller assembly 46 also telescopes within its respective cable housing 54 and similarly is yieldably supported upon compression springs 102 located within guide tubes 104 and receiving aligning pins 106 which depend from the undersurface of top plate 50. Bolt 108 and slots 110 restrict telescoping movement of top plate 50.

With the construction just described movement of handle 68 in a clockwise direction causes rotation of shaft 70 in the opposite direction and, since reels 76—77 are driven thereby such movement will shorten cables 82 and 86 equally and hence uniformly raise that end of the cradle.

At the opposite end of the same cradle assembly a similar arrangement is provided within cable housing 54 wherein reels 112—117 and pulley 114 mounted on spaced shafts 116 and 118, respectively, are rotated in unison with the corresponding parts mounted within cable housing 56. Cable 111 ascends vertically and cable 113 is guided between reel 117 and pulley 114 by guide 115.

The telescoping arrangement between the cable housings previously described includes sets of tubular sleeves 72, 74 which surround shafts 116 and 118. These sets of sleeves are joined by collars 120, 122. It will be apparent that by loosening such collars and moving the cable housings to an adjusted position the spacing therebetween may readily be varied. The elongate shafts 116, 118, being slidably keyed to operate reels 112—117, and to pulley 114 will slide therethrough and may protrude from the left end of cable housing 54 a greater or lesser amount depending upon the selected spacing. Of course if desired shafts 116 and 118 may also be made telescoping so as to avoid the protrusion of their projecting ends form housing 54.

It will be apparent that with the described construction the cables extend and retract in unison being linked together by the common drive shafts and reel and pulley arrangements. Movement of these in turn is controlled by the power drive output shaft 70 extending from the mechanical advantage gear train mechanism 66. A free-running or unlocked condition of mechanism 66 may be achieved by rotation of crank wheel 124 which releases the brake. This permits free rotation of shaft 70 and shafts 116, 118 whenever tension is applied to one of the extendible cables. Hence such cables may readily be manually drawn from the housing and their ends secured at the missile hoist station. The details of operation of the gear train and brake mechanism and their various modes of operation are set forth in the previously-cited U.S. Pat. and form no part of the present invention.

Figure 7:
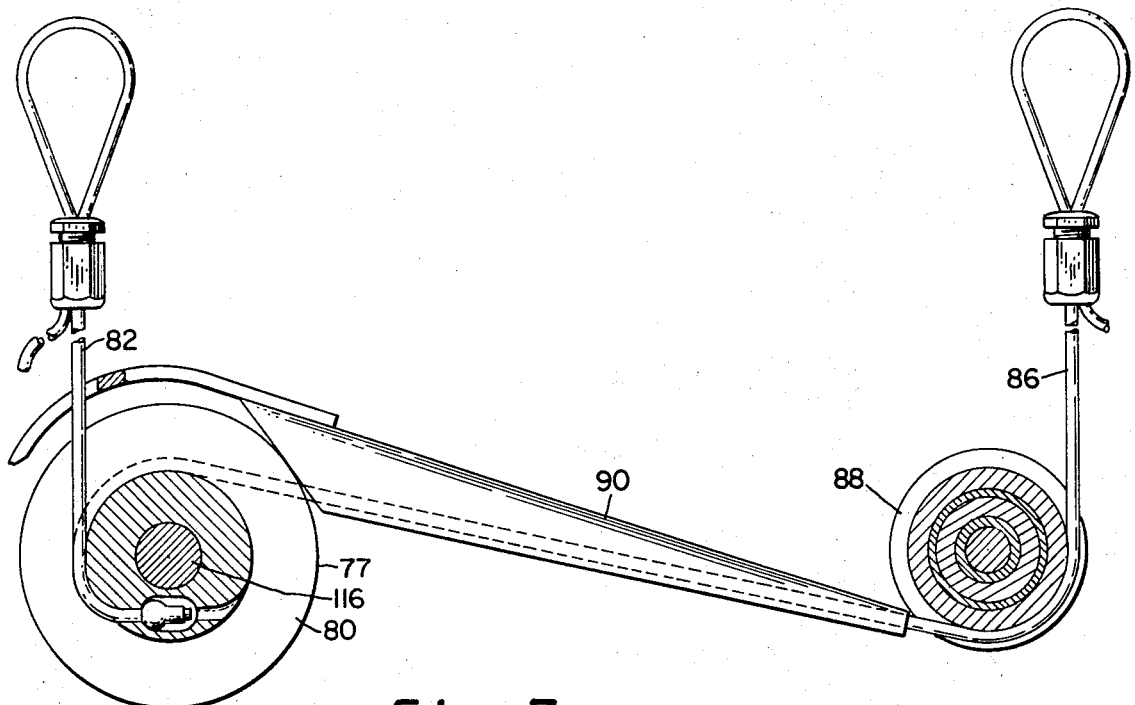
FIG. 7 is a detail view showing the cable reeling arrangement.
Figure 9:
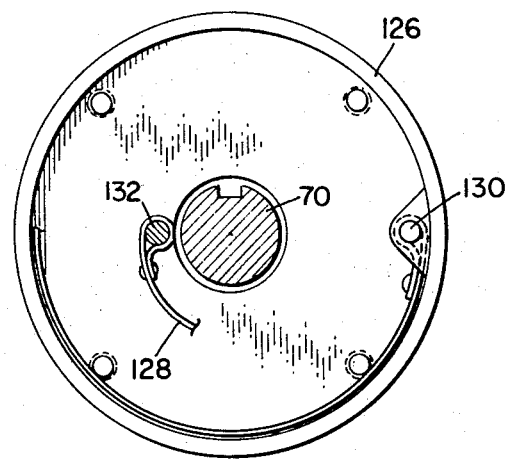
FIG. 9 is a detail view of the cable rewind spring arrangement.

In order to retract the cables into the cable housings when they have served their purpose spiral rewind springs may be provided within drumlike housings 126—127. FIG. 9 shows the interior of housing 126 and as there illustrated the outer end of the spiral spring 128 is anchored to the stationary housing at 130 and the opposite inner end is secured to the rotatable shaft at 132. The action of this spring is such as to normally urge its associated reel 76, 77, 112 or 117 (FIG. 7) in a counterclockwise direction thus tending to retract the cable of that reel. Should there be any failure of such spring to fully retract the cables, hand crank wheel 124 may be manipulated to rewind the cables.

As shown each spring operates through a conventional ratchet mechanism so that each cable 82, 86, 111, 113 may separately be withdrawn without withdrawal of the other cables. All of the independent reels are independently attached to their shafts by means of respective ratchets 79, 81, 83, 85. In operation each respective spring attempts to wind its respective cable about its respective reel. As a consequence each cable may be pulled out of the cable housing independently while the other reels remain stationary due to ratcheting action of their ratchets and the countertorque provided by their respective springs. This modified arrangement provides independent tension upon each cable at all times.

Figure 5:
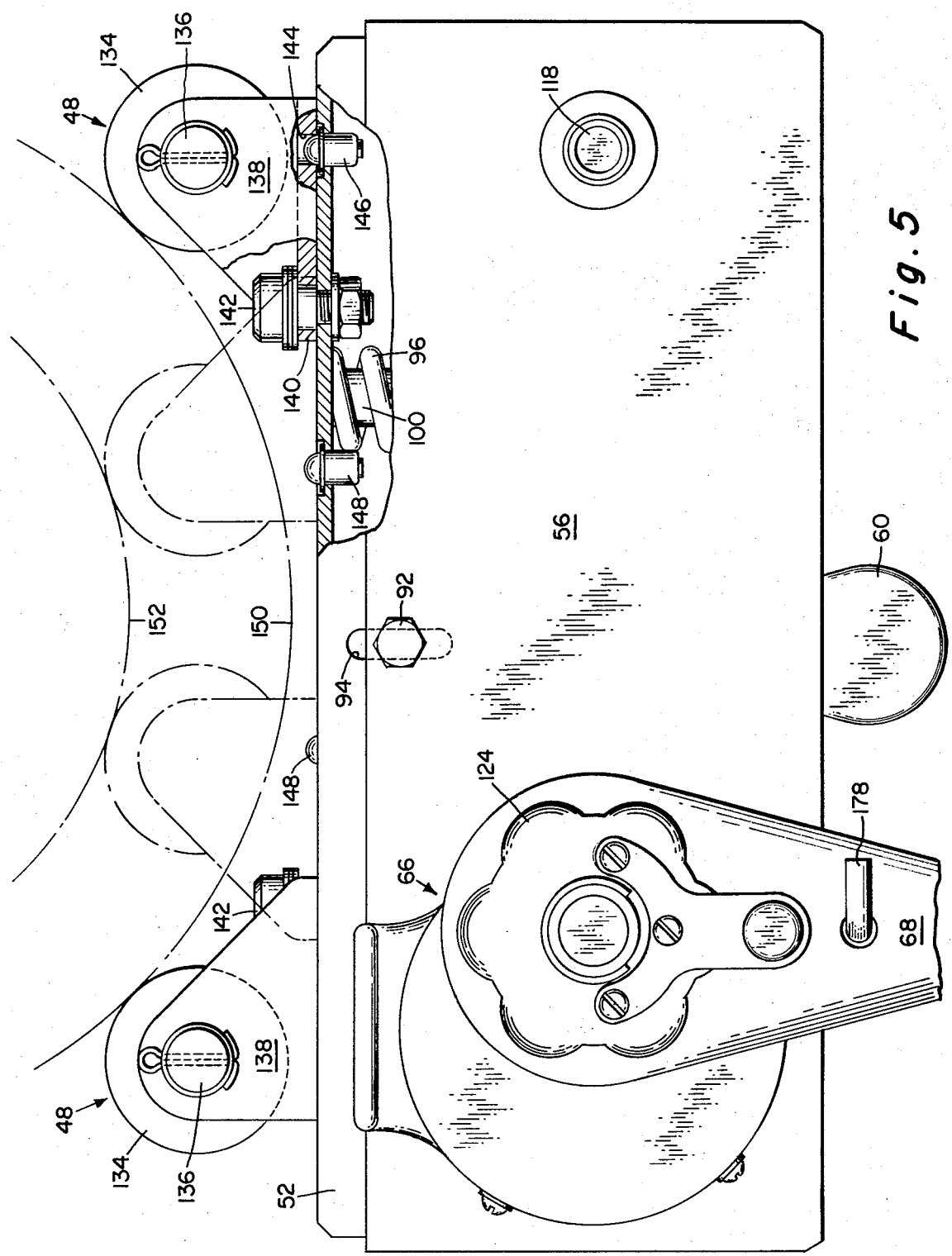
FIG. 5 is an enlarged vertical elevational view with a portion broken away looking at the right side of the right cable housing of FIG. 3 and showing the actuating means and one form of load supporting roller adjustment.

In order to accommodate loads of varying diameters there are mounted on top plates 50, 52 missile supporting roller assemblies 46, 48. As best shown in FIG. 5 roller assembly 48 comprises roller members 134 mounted upon stub shafts 136 supported between upright spaced cheeks 138 mounted on horizontal base plate 140 with an offset pivot point comprising bolt 142 and provided with a detent receiving opening 144 to receive either spring biased detent 146 or 148.

As shown in FIG. 3 stub shafts 136 and 156 may each be surrounded by roller spacing springs 137 and 157 respectively which normally keep these rollers centrally spaced between the upright cheeks but are sufficiently weak to permit sliding movement of each roller along its respective shaft as may be necessary to permit a missile to be shifted fore or aft to facilitate alignment with an aircraft's missile support bracket.

It will be apparent that this adjustable roller arrangement will accommodate either large diameter loads indicated by large radius curved line 150, or smaller diameter loads indicated by smaller radius curved line 152. With change of position the load engaging roller has been displaced horizontally from an inner to an outer position but its height remains constant. Also, when moved to the changed position of FIG. 5, rollers 134, being disposed closer together to support smaller diameter loads, allow the missile to rotate about its longitudinal axis approximately 90° without interference by protrusions such as wiring tunnels, etc. which may be located on the outside surface of the missile. Such freedom of roll may be required, for example, depending upon whether the missile is being mounted at a right or left aircraft wing station.

At the opposite end of the cradle, top plate 50 of cable housing 54 is provided with a pair of adjustable missile engaging roller assemblies 46 but in this arrangement (FIG. 3) load supporting roller 154 mounted upon stub shaft 156 is adjustable generally in an upward direction by its support which comprises spaced cheeks 158 interconnected by base 160 and pivoted on hinge pin 162.

Figure 6:
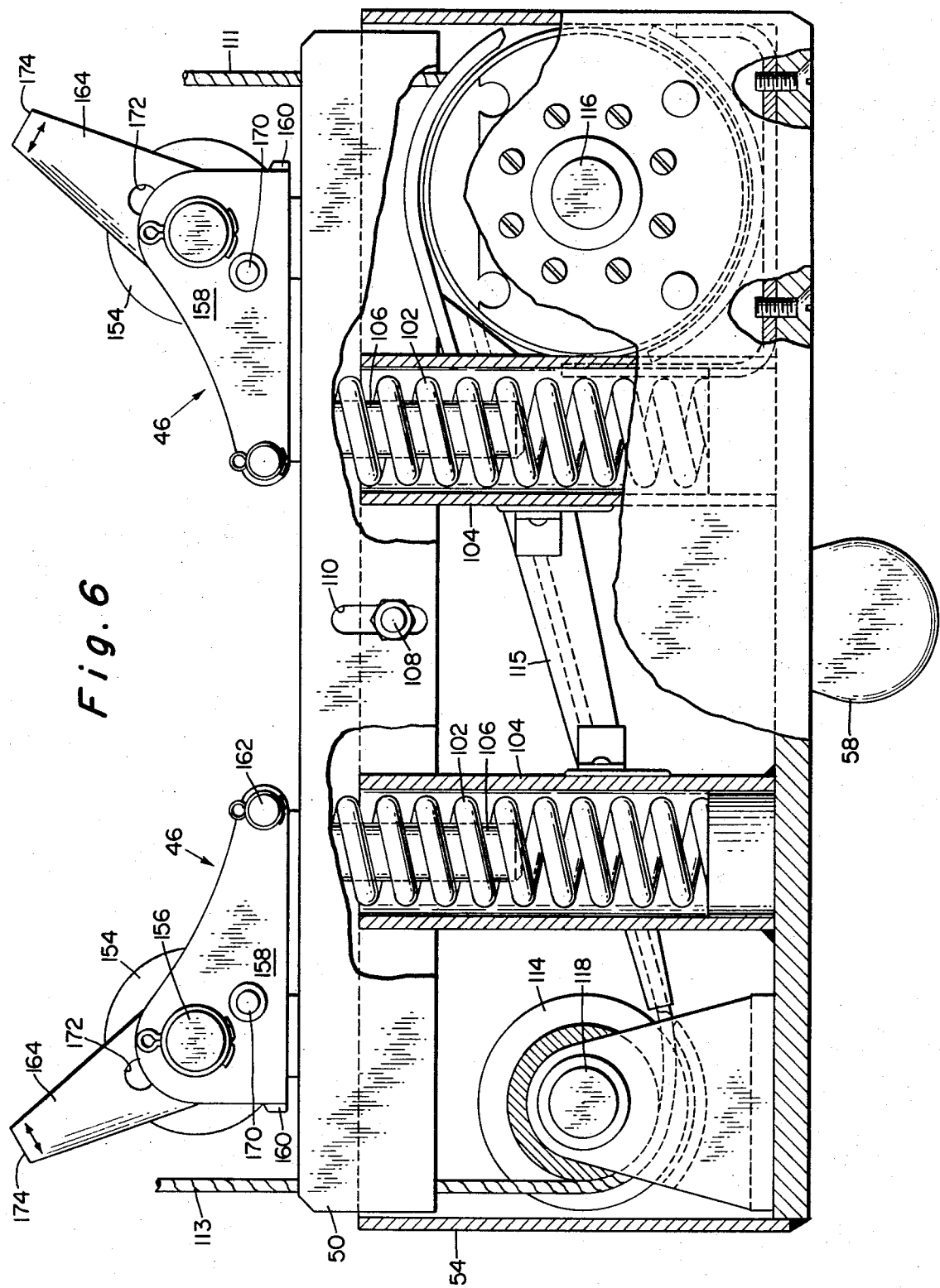
FIG. 6 is an enlarged end elevational view with portions broken away looking at the left side of the left cable housing of FIG. 3.
Figure 8:
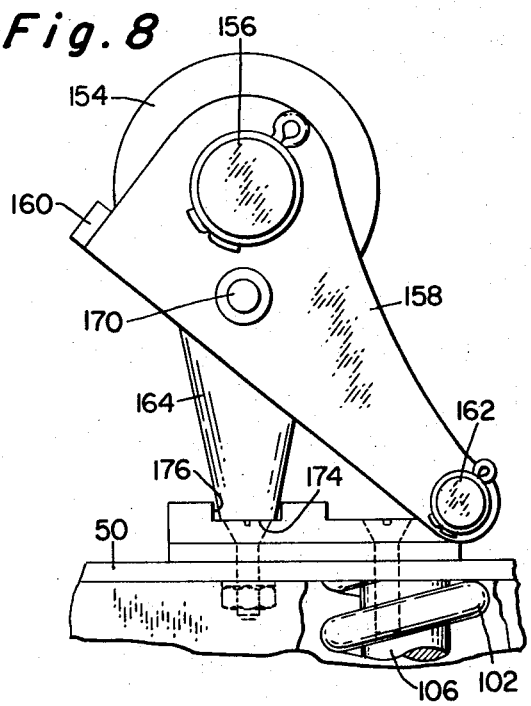
FIG. 8 is an enlarged side elevational view of one of the load supporting roller constructions in raised position.

To retain the roller in a raised position there is provided a bracket comprising end plates 164 interconnected by a web 166 which bracket is journaled about shaft 156 and may swing into a depending position where it is locked by the engagement of spring pressed detent 170 (FIG. 6) in socket 172. In that position the tip 174 rests in a slot 176 (FIG. 8) and the roller is thereby braced in its raised position. It will be obvious that in combination with the previously described adjustable roller arrangement these missile engaging rollers are particularly adapted to "stepped" missiles which are of one diameter at one end and a different diameter at the opposite end.

It will be apparent that the adjustable roller arrangements 46 and 48 may be combined in any fashion and that all roller arrangements employed may be of one type or the other if desired.

In operation the saddles 32, 34 of the vehicle are first adjusted to the desired degree of separation. Thereafter the cable housings 54, 56 are adjusted to match the saddle position and the cradles are mounted in place. Then a missile or other elongate cylindrical load is placed upon each cradle, the missile supporting roller assemblies having first been set in accordance with missile diameter requirements. Preferably the mechanical advantage gear train mechanism 66 is located at the right hand end of the vehicle as viewed from the side so that the hand lever 68 is conveniently accessible to the operator.

Thereafter the vehicle is moved into position under the missile station such as an aircraft wing or fuselage and crank wheel 124 is so operated as to free shaft 70. Thereafter the extendible cables are each withdrawn and their terminal ends 84 are then secured adjacent the missile loading station. Thereupon mechanism 66 is engaged so that movement of the hand lever 68 rotates shaft 70 and the cable reels rotate in a counterclockwise direction (FIG. 7), and, through the interconnecting arrangement previously described, uniformly retract all cables into the cable housings so that the cradle is effectively suspended from the cables. As the operation proceeds the cradle climbs the cables to raise the missile up to the launcher loading position. If, due to misalignment one end of a cradle engages first the other end may continue to be raised up due to the yielding springs supporting the top plates 50, 52 since these plates telescope within their respective cable housings. Due to the brake construction incorporated in the gear train mechanism 66 it is impossible for the load to slip during the raising or lowering operation. In order to lower a missile from a missile loading stage thumb lever 178 on hand lever 68 is flipped to the descend position and oscillation of such lever then causes the cradle to descend until it again rests upon the top surface of the saddles with the cradle aligning pegs 58, 60 engaging in their respective sockets 62, 64.

The described construction is adapted to modification in order to handle missiles of great weight, or to speed missile elevation by change of ratio in the gear train, through duplication of the gear train assembly 66 at the opposite end of the cradle. Such assemblies would then be operated in unison by at least two operators and, if desired, could work together on all four cables, or each gear train assembly could operate its adjacent pair of cables at its end of the cradle through suitable changes in the mechanical interconnection between the cable actuating contents of housings 54 and 56. Of course if four gear train assemblies were employed, one located at each corner of the cradle, even greater loads could be lifted.

The missile raising cables may also be used to "strap down" the missile to the cradle during transport. This may be accomplished by attaching the ends of cables 82—86 and 111—113 together over the missile and imposing a slight tension thereon by use of the hand lever 68. This eliminates the need for separate tie-down straps on each cradle.

Obviously many modifications and variations of the present invention are possible in the light of the above teachings. It is therefore to be understood that within the scope of the appended claims the invention may be practiced otherwise than as specifically described.

I claim:
1. A vehicle and hoist assembly for spotting a heavy elongate load below an overhead station and elevating it into place at said station comprising, in combination:
   a vehicular chassis;
   a framework supported upon said chassis;
   means restricting lateral shifting of the framework on the chassis but permitting vertical movement therefrom;
   said framework being of a rectangular configuration generally corresponding to the width and length of a load supported thereon;
   a plurality of flexible load raising lines normally housed in said framework;
   said lines being extendible from the four corners of said framework for securement of their extended terminal ends at corresponding points adjacent the overhead station; and
   means on said framework for retracting said lines into the framework at a uniform rate to raise the latter and its load to the overhead station.
2. The device of claim 1 wherein the supporting framework includes:
   a forward load support member and a rear load support member; and
   means for selectively positioning one of said members relative to the other member.
3. The device of claim 1 wherein the extensible members are flexible and are stored within the cradle framework when not in use.
4. The device of claim 2 wherein the forward and rear support members are provided with load engaging rollers, said rollers being adjustable to accommodate missiles of differing diameters.
5. The device of claim 1 wherein the extendible members are flexible and the framework includes reels upon which the extendible members are wound and guide means therefore.
6. The device of claim 5 wherein said reels are driven in unison by a common operating member.
7. The device of claim 6 wherein said common operating member has a forward drive mode, a reverse drive mode, a braking mode and a disconnect mode.